(12) United States Patent
Lyu (10) Patent No.: US 11,909,840 B2
(45) Date of Patent: Feb. 20, 2024

(54) RESOURCE SUBSCRIPTION METHOD, DEVICE, AND STORAGE MEDIUM

(71) Applicant: GUANGDONG OPPO MOBILE TELECOMMUNICATIONS CORP., LTD., Guangdong (CN)

(72) Inventor: Xiaoqiang Lyu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 21 days.

(21) Appl. No.: 17/737,939

(22) Filed: May 5, 2022

(65) Prior Publication Data

US 2022/0263920 A1 Aug. 18, 2022

Related U.S. Application Data

(63) Continuation of application No. PCT/CN2019/116354, filed on Nov. 7, 2019.

(51) Int. Cl.
*H04L 67/55* (2022.01)
*G06F 8/71* (2018.01)
*H04L 67/00* (2022.01)

(52) U.S. Cl.
CPC .............. *H04L 67/55* (2022.05); *G06F 8/71* (2013.01); *H04L 67/34* (2013.01)

(58) Field of Classification Search
CPC ............ H04L 67/55; H04L 67/34; G06F 8/71
USPC ......................................................... 709/203
See application file for complete search history.

(56) References Cited

U.S. PATENT DOCUMENTS

2005/0160063 A1 7/2005 Pan et al.

FOREIGN PATENT DOCUMENTS

| CN | 103060931 A | 5/2013 |
| CN | 104065517 A | 9/2014 |
| CN | 104639429 A | 5/2015 |
| CN | 106559389 A | 4/2017 |
| CN | 103220307 B | 7/2017 |

OTHER PUBLICATIONS

International Search Report (ISR) dated Aug. 5, 2020 for Application No. PCT/CN2019/116354.
Written Opinion (WOSA) dated Aug. 5, 2020 for Application No. PCT/CN2019/116354.

*Primary Examiner* — Sibte H Bukhari
(74) *Attorney, Agent, or Firm* — Ladas & Parry, LLP (57) ABSTRACT

The embodiments of the present application provide a resource subscription method, a device, and a storage medium, a subscription device and a resource collection device respectively maintain a current tag of a subscription resource, where the tag of the subscription resource is generated according to a generation rule, tags generated according to the generation rule have an association relationship; during a resource update process, the subscription device may determine whether a version is missing according to the current tag of the subscription resource transmitted by the resource collection device, a tag of the subscription resource stored locally and the generation rule. Since one or more versions before a current version of the target resource are stored on the resource collection device, the subscription device may request a missing version from the resource collection device when a version is missing, thereby ensuring that the user will not miss the subscription resource.

11 Claims, 5 Drawing Sheets

RESOURCE SUBSCRIPTION METHOD, DEVICE, AND STORAGE MEDIUM

CROSS-REFERENCE TO RELATED APPLICATION

This application is a continuation of International Application No. PCT/CN2019/116354, filed on Nov. 7, 2019, the content of which is incorporated herein by reference in its entirety.

TECHNICAL FIELD

Embodiments of the present application relate to a communication technology, and in particular, to a resource subscription method, a device, and a storage medium.

RELATED ART

With the development and popularization of internet technology, acquiring information through the internet has become an important way for people to acquire information, for example, people may subscribe to their favorite news topics, such as current affairs, sports, entertainment, etc., from news providers through news applications (APP) installed on their mobile phones, when the above topics of the news are updated, the news provider will push the corresponding news to the APP used by a user who has subscribed to the corresponding news, so that the user can read the news in time. With the development of the above subscription/push technology, this technology is not only used for information transmission in a scenario of device to cloud (D2C), but also may be applied to a business processing layer under an application layer, a field of device to device (D2D) and a field of Internet of Things. For example, a mobile phone subscribes to a temperature of a thermometer at home, and when the temperature of the thermometer is greater than or equal to (>=) 26 degrees, an air conditioner is turned on.

In an existing subscription/push scheme, a subscription device (as a client) transmits a subscription request to a subscription target device (as a server), the subscription request may include an identifier of subscription content, an identifier of a subscription device, a subscription identifier, and a request identifier, etc., a subscription target device receives the subscription request, authenticates the subscription request and starts to monitor whether the subscription content has changed, and the subscription target device also returns a subscription request response to the subscription device. When monitoring a change in the subscription content, the subscription target device transmits a notification message to the subscription device, where the notification message includes the updated subscription content.

However, in the existing subscription process, due to the loss of the notification message, the subscription device may not receive the updated subscription content transmitted by the subscription target device, causing the user to lose key subscription content.

SUMMARY

The embodiments of the present application provide a resource subscription method, a device, and a storage medium.

In a first aspect, an embodiment of the present application may provide a resource subscription method applied to a subscription device, and the method includes:

receiving a resource update message transmitted by a resource collection device, where the resource update message includes updated content of a target resource subscribed and a first tag of the target resource, and the first tag is a current tag of the target resource stored on the resource collection device;

determining whether a version of the target resource is missing according to the first tag, a second tag of the target resource stored locally, and a generation rule of tags, where tags generated according to the generation rule have an association relationship, the generation rule of tags used by the subscription device and a generation rule of tags used by the resource collection device are the same, and the second tag is a current tag of the target resource stored on the subscription device;

acquiring a missing version of the target resource from the resource collection device and updating the second tag according to the resource update message, in case that the version of the target resource is missing; and updating the second tag according to the resource update message in case that no version of the target resource is missing.

In a second aspect, an embodiment of the present application may provide a resource subscription method applied to a resource collection device, and the method includes:

in case that an update of a target resource is monitored, generating a new tag for the target resource according to a generation rule of tags and a current tag of the target resource stored locally and updating the current tag of the target resource to the new tag, where tags generated according to the generation rule have an association relationship; and transmitting a resource update message to a subscription device, where the resource update message includes a first tag of the target resource and update content of the target resource, and the first tag is a current tag of the target resource stored on the resource collection device.

In a third aspect, an embodiment of the present application may provide a subscription device, including:

a processor and a memory, wherein the memory is configured to store a computer program, and the processor is configured to call and run the computer program stored in the memory to:

control an input interface to receive a resource update message transmitted by a resource collection device, where the resource update message includes updated content of a target resource subscribed and a first tag of the target resource, and the first tag is a current tag of the target resource stored on the resource collection device;

determine whether a version of the target resource is missing according to the first tag, a second tag of the target resource stored locally, and a generation rule of tags, where tags generated according to the generation rule have an association relationship, the generation rule of tags used by the subscription device and a generation rule of tags used by the resource collection device are the same, and the second tag is a current tag of the target resource stored on the subscription device;

control the input interface to acquire a missing version of the target resource from the resource collection device in case that the version of the target resource is missing; and update the second tag according to the resource update message.

In a fourth aspect, an embodiment of the present application may provide a non-transitory computer readable storage medium with computer executable instructions stored thereon, when the computer executable instructions are executed by a processor, the resource subscription method as described in the second aspect is implemented.

The embodiments of the present application provide a resource subscription method, a device, and a storage medium, a subscription device and a resource collection device respectively maintain a current tag of a subscription resource, where the tag of the subscription resource is generated according to a generation rule, tags generated according to the generation rule have an association relationship; during a resource update process, the subscription device may determine whether a version is missing according to the current tag of the subscription resource transmitted by the resource collection device, a tag of the subscription resource stored locally and the generation rule. Since one or more versions before a current version of the target resource are stored on the resource collection device, the subscription device may request a missing version from the resource collection device when a version is missing.

BRIEF DESCRIPTION OF DRAWINGS

The accompanying drawings here that are incorporated into the specification and constitute a part of the specification show embodiments in accordance with the present disclosure, and are used together with the specification to explain the principle of the present disclosure.

The specific embodiments of the present disclosure have been illustrated by the above accompanying drawings, which will be described in more detail below. These accompanying drawings and literal descriptions are not intended to limit the scope of the concept of the present disclosure in any way, but to explain the concept of the present disclosure to those skilled in the art by referring to specific embodiments.

DESCRIPTION OF EMBODIMENTS

The technical solutions in the embodiments of the present application will be described clearly and completely with reference to the accompanying drawings in the embodiments of the present application to make the purposes, technical solutions and advantages of the embodiments of the present application clearer, obviously, described embodiments are part of the embodiments of the present application, rather than all of the embodiments. Based on the embodiments in the present application, all other embodiments obtained by an ordinary person skilled in the art without paying creative work all belong to the protection scope of the present application.

The terms "first", "second", etc. in the specification, claims, and the above accompanying drawings of the embodiments of the present application are used to distinguish similar objects, and are not necessarily used to describe a specific sequence or order. It should be understood that the data used in this way may be interchanged under appropriate circumstances, so that the embodiments of the present application described herein, for example, may be implemented in a sequence other than those shown or described herein. In addition, the terms "include" and "have" and any deformations of them are intended to cover non-exclusive inclusion, for example, processes, methods, systems, products, or devices that include a series of steps or units are not necessarily limited to those steps or units clearly listed, but may include other steps or units that are not clearly listed or are inherent to these processes, methods, products, or devices.

Figure 1:
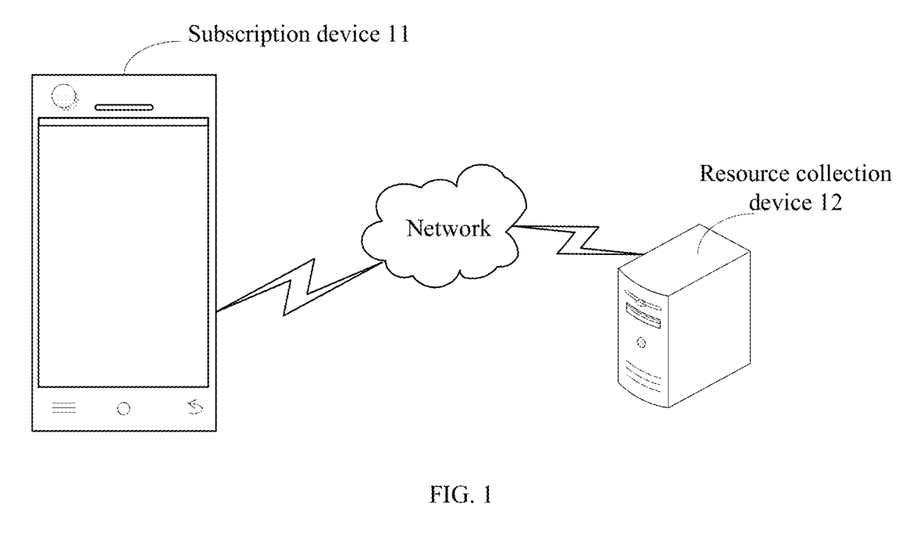
FIG. 1 is a schematic diagram of a network architecture to which an embodiment of the present application is applicable.

FIG. 1 is a schematic diagram of a network architecture to which an embodiment of the present application is applicable. As illustrated in FIG. 1, the network architecture includes at least: a subscription device 11 and a resource collection device 12, which may connect and communicate with each other in a wired or wireless manner. It may be understood that there may be one or more subscription devices 11 and resource collection devices 12 in actual network deployment, and FIG. 1 simply takes one as an example. In addition, in the architecture illustrated in FIG. 1, an example is taken where the subscription device 11 is a mobile phone, it may be understood that the subscription device 11 is not limited to a mobile phone, and may also be an electronic device, such as a computer, an intelligent television, a game console, etc.

The subscription device 11 and the resource collection device 12 may communicate in a client/server (CS) mode, where the subscription device 11 serve as a client, and the resource collection device 12 serves as a server. The resource collection device 12 is configured to provide resources for the subscription device 11 and manage resources, the subscription device 11 may subscribe to a target resource at the resource collection device 12, and the resource collection device 12 pushes the resource to the subscription device 11 according to content subscribed by the subscription device 11.

The method of the embodiments may be applied to internet scenarios, in the internet scenarios, the subscription device 11 may be a control device used to control intelligent home appliances, such as an intelligent phone, a computer, an intelligent TV, etc., the subscription device 11 may control the intelligent home appliance through an installed application (app), and the intelligent home appliance may be an intelligent desk lamp, an intelligent speaker, or an intelligent air conditioner. Correspondingly, the resource collection device 12 manages resources provided by the intelligent home appliances, and the resources may be functions of the intelligent home appliances, for example, the resources in the resource collection device 12 include: an on-off resource of the intelligent table lamp, a brightness resource of the intelligent table lamp, and a color resource of the intelligent table lamp, or an on-off resource of the intelligent air conditioner, a mode resource of the intelligent air conditioner, a temperature resource of the intelligent air conditioner, and a wind speed resource of the intelligent air conditioner, etc.

An example is taken where the subscription device 11 is an intelligent phone, the intelligent phone is installed with an app that controls the intelligent air conditioner, a user may subscribe to the on-off resource and temperature resource of the intelligent air conditioner through the app, and the resource collection device 12 transmits information about the resource to the intelligent phone according to the resource subscribed by the user.

The resource collection device 12 manages multiple resources, which are distinguished by unique resource identifiers. In the embodiments of the present application, the resource collection device 12 may manage the resources of one or more intelligent home appliances, for example, there are multiple resource collection devices in a network, a resource collection device A only manages various resources of the intelligent air conditioner, a resource collection device B only manages various resources of the intelligent refrigerator, and a resource collection device C may manage various resources of the intelligent table lamp. Or, the resources of multiple intelligent home appliances of the same manufacturer are managed by a resource collection device, for example, the resource collection device A manages the resources of the intelligent home appliances of the manufacturer A, and the resource collection device B manages the resources of the intelligent home appliances of the manufacturer B.

In a traditional method, after the subscription device subscribes to a certain resource from the resource collection device, when the resource is updated, the resource collection device transmits a resource update message to the subscription device to update the resource, but the resource update message transmitted by the resource collection device may be lost, thus causing the user to miss important information.

In order to solve the problems in prior art, in the embodiments of the present application, a tag is defined for each resource, when a resource is updated, a new tag is regenerated for the resource according to a generation rule of tags for the resource, where tags generated according have an association relationship, and version content corresponding to different tags of the same resource is different. Every time a resource is updated, the resource collection device carries a current tag of the resource in the resource update message and transmits the current tag to the subscription device, the subscription device may determine whether a version of the resource is missing according to the generation rule of tags, a current tag of the resource stored locally, and the current tag of the resource included in the resource update message, since the tags generated according to the generation rule have an association relationship, the subscription device may determine whether a version is missing according to the current tag received and the tag stored locally. Then, a missing version is requested from the resource collection device according to a tag of the missing version, thereby ensuring that the user will not lose the subscription resource.

It should be clarified that the version of the target resource and the tag of the target resource involved in the embodiments of the present application are different, a tag of the target resource is used to uniquely identify a version of the target resource, the version of the target resource refers to information or content of the target resource, or target resource information of a certain version, the tag of the target resource refers to a tag of a certain version of the target resource.

Figure 2:
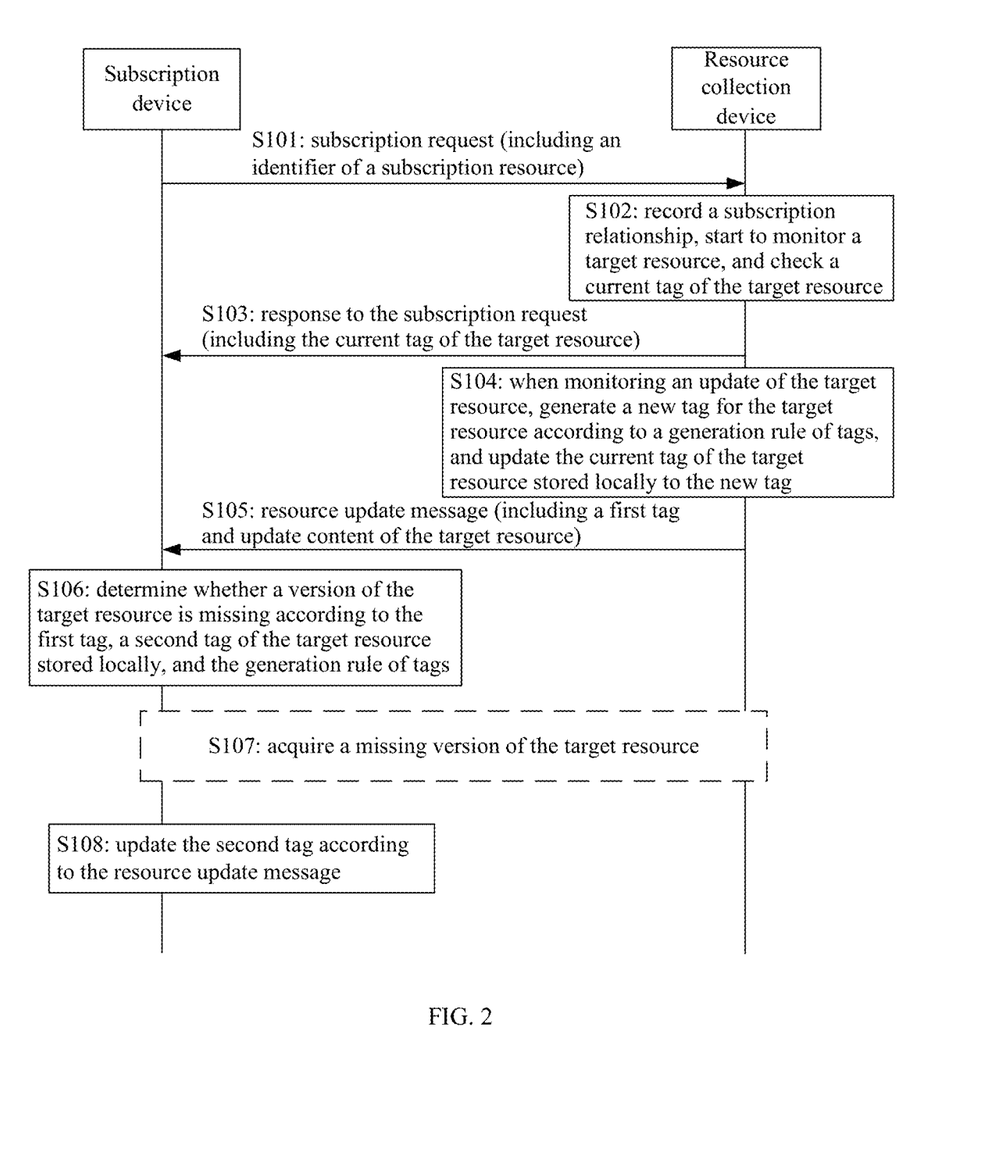
FIG. 2 is a signaling flowchart of a resource subscription method provided by a first embodiment of the present application.

Based on the network architecture illustrated in FIG. 1, a first embodiment of the present application provides a resource subscription method, FIG. 2 is a signaling flowchart of a resource subscription method provided by the first embodiment of the present application, as illustrated in FIG. 2, the method provided by this embodiment includes the following steps:

S101: a subscription device transmits a subscription request to a resource collection device, where the subscription request is used to request to subscribe to a target resource.

A message type of the subscription request may be Retrieve, and the subscription request includes the following information: an identifier of the subscription device, an identifier of the target resource, a request identifier, an operation type, and an identifier of the resource collection device.

Generally, a user uses a client (which may be an app) installed on an electronic device to subscribe to resources, therefore, the subscription device refers to a device on which a client with a subscription function is installed, and the identifier of the subscription device refers to an identifier of the electronic device on which the client is installed.

The request identifier is used to complete the binding of a request and a response (or called an answer), after the subscription device transmits the subscription request, a related response message returned by the resource collection device to the subscription device includes the request identifier, so that the subscription device may confirm a relationship between the messages.

The operation type represents an operation of the subscription request on the resource, which is generally CURDN. CURDN is the abbreviation of Create, Update, Retrieve, Delete, Notify and is also called as a rest operation type.

In an embodiment, the subscription request also includes a subscription identifier which is used to uniquely identify a subscription relationship, the subscription relationship is composed of a subscription device, a subscription resource, and a resource collection device. Subsequently, the subscription identifier may be carried in messages interacted between the subscription device and the resource collection device, and the subscription device and the resource collection device may determine the subscription relationship according to the subscription identifier. When the subscription identifier is not carried in a message interacted between the subscription device and the resource collection device, the subscription device and the resource collection device may jointly determine the subscription relationship according to the identifier of the subscription device, the identifier of the subscription resource, and the identifier of the resource collection device included in the message.

In an embodiment, the subscription request may also include first indication information which is used to indicate whether to set a tag for the target resource, if the first indication information indicates setting of a tag for the target resource, performing the resource subscription according to the method of the embodiments of the present application, if the first indication information indicates no setting of the tag for the target resource, the subscription device does not generate a tag for the target resource, and performs the resource subscription in a traditional manner. The first indication information is, for example, represented by a tagflag, and when the tagflag=true, it represents setting of a tag for the target resource, otherwise, it is a non-tag manner. When the tagflag=false, it represents no setting of the tag for the target resource.

In a possible implementation manner, a default value of the tagflag is false or true, and the user may choose whether to set a tag for the target resource before subscribing to the resource. If the user does not choose, the default value of tagflag will be carried in the subscription request.

After the resource collection device receives the subscription request, in one manner, if the first indication information indicates setting of the tag for the target resource, the resource collection device sets the tag for the target resource, and if the first indication information indicates no setting of the tag for the target resource, the resource collection device does not set a tag for the target resource. In another manner, the resource collection device determines whether to set a tag for the target resource according to the first indication information and its own selection strategy. The selection strategy may be, for example, that the manner of setting a tag for the target resource is supported for part of subscription devices, while the method of setting a tag for the target resource is not supported for the other part of the subscription devices, the subscription devices may be divided according to types of the subscription devices, priorities of the subscription devices or other parameters, which is not limited in this embodiments.

In an embodiment, the subscription request does not carry the first indication information, but carries capability information of the subscription device, the capability information indicates whether the subscription device supports the manner of setting a tag for the target resource, the resource subscription device may decide whether to set a tag for the target resource according to the capability information of the subscription device.

In an embodiment, a piece of attribute information may also be set in the resource collection device, the attribute information is used to indicate whether the resource collection device supports the manner of setting the tag for the target resource, and the subscription device may actively query the resource collection device whether the resource collection device supports the manner of setting the tag for the target resource, and the resource collection device may also actively notify the subscription device whether the resource collection device supports the manner of setting the tag for the target resource.

In an embodiment, the subscription request may not carry the first indication information and the capability information of the subscription device, and the resource collection device determines whether to set a tag for the target resource according to the aforementioned selection strategy.

In the embodiments of the application, multiple subscription devices may subscribe to the same resource, that is, there are multiple subscription relationships for the same resource. For example, there are three members in a family, and the three members can all subscribe to the same resource, such as the temperature resource of the air conditioner, three members all use their mobile phones to subscribe to the temperature resource of the air conditioner, that is, the subscription devices are different, therefore, a total of three subscription relationships are formed, the subscription devices of the three subscription relationships are different, but the subscription resource of the three subscription relationships are the same, and the resource collection device of the three subscription relationships are the same.

When the target resource has multiple subscription relationships, in a possible implementation manner, the multiple subscription relationships correspond to a tag of the target resource, that is, the target resource in the multiple subscription relationship has the same tag. In another possible implementation manner, each subscription relationship in the multiple subscription relationships corresponds to a tag of the target resource, and multiple tags of the target resource corresponding to the multiple subscription relationships are different.

It may be understood that the subscription request in the present application refers to any message that may achieve the request of subscription to the target resource, the name of the subscription request may be different with the evolution of the network or the change of the scenario, in the present application, an example is taken just for illustration and does not constitute a limitation, the subscription request may also be replaced with a subscription message, a subscription request message, a resource subscription request, etc.

S102: the resource collection device records the subscription relationship, starts to monitor the target resource, and checks a current tag of the target resource.

After receiving the subscription request, the resource collection device records the subscription relationship according to the identifier of the subscription device, the identifier of the target resource, and the identifier of the subscription device included in the subscription request. If the subscription request includes a subscription identifier, the resource collection device also records a corresponding relationship between the subscription identifier and the subscription relationship.

The current tag of the target resource may be stored in a new type of resource information defined in the embodiments of the present application, the resource information of this type may include: a current tag, a tag list (taglist), a target resource identifier (targetresourceID), the identifier of the subscription device (orginaldeviceID), and a subscription type (subscribetype).

The current tag is the latest tag of the target resource, the resource collection device continuously monitors the target resource, generates a new tag for the target resource according to a preset generation rule of tags when the target resource changes, and updates the current tag to the new tag, and each time the target resource changes, the resource collection device will update the current tag of the target resource.

The tag list includes a current version of the target resource and content of one or more versions earlier than the current version, when a certain version of the target resource is missing during the transmitting process, the subscription device may request the missing version from the tag list.

In one manner, all versions of the target resource are included in the tag list.

In another manner, in order to save storage resources of the resource collection device, only part of the versions of the target resource are included in the tag list, and versions other than the versions in the tag list are deleted by the resource collection device.

In an exemplary manner, the versions included in the tag list are the current version of the target resource and N versions closest to an update time of the current version, and the value of N is greater than or equal to 1, for example, the value of N is 3 or 5.

An example is taken where the value of N is 3, assuming that the current version of the target resource is the 10th version, 3 versions closest to the update time of the current version are: the 7th-9th versions, so the 7th-9th versions of the target resource are saved in the tag list. The tag list is constantly updated with changes in the current tag of the target resource, for example, the current version of the target resource at the current moment is the 10th version, after a period of time, the current version of the target resource is updated to the 11th version, then the resource collection device accordingly moves the 7th version out of the tag list, and adds the 10th version to the tag list.

In another exemplary manner, the versions in the tap list are the current version and the versions whose update times are within a preset time from the current time, for example, the tag list saves the versions that were updated within 1 hour from the current time, and all earlier versions have been deleted.

In another exemplary manner, each time the version of the target resource is updated, a version before the update is added to the tap list, and a timer is started for this version, and this version is deleted after the timer expires. Each version in the tag list has a timer, the corresponding version is deleted after the timer expires.

The subscription types may include types of creation, addition, deletion, modification, etc.

In an embodiment, the resource information may also include a subscription identifier (subscribeID) or other information.

S103: the resource collection device transmits a response to the subscription request to the subscription device, where the response to the subscription request includes a current tag of the target resource.

The response to the subscription request is used to notify the subscription device that the resource collection device has received the subscription request, the subscription device acquires the current tag of the target resource from the response to the subscription request and saves the current tag of the target resource after receiving the response to the subscription request. The response to the subscription request may include a request identifier, the request identifier included in the response to the subscription request is the same as the request identifier included in the subscription request, the subscription device determines a relationship between the response to the subscription request and the subscription request according to the request identifier.

In an embodiment, the subscription device may also maintain the same resource information as the resource collection device for maintaining the current tag of the target resource. Each time the target resource is updated, the resource collection device will synchronize the updated target resource with the subscription device, thereby ensuring that the current version of the target resource maintained by the subscription device is in consistent with the current version of the target resource maintained by the resource collection device.

In an embodiment, the resource information maintained by the subscription device and the resource information maintained by the resource collection device may also be different, for example, in comparison with the resource information maintained by the resource collection device, the resource information maintained by the subscription device lacks the tag list, or the resource information maintained by the subscription device does not include the subscription identifier.

In this embodiment, the subscription device acquires the current tag of the target resource from the resource collection device during the process of establishing a subscription relationship with the resource collection device, and the current tag of the target resource acquired during the establishment of the subscription relationship is an initial tag of the target resource.

Steps S101-S103 describe a way to establish a subscription relationship: the subscription device transmits a subscription request to the resource collection device, the resource collection device returns a response to the subscription request to the subscription device, and the subscription device establishes the subscription relationship according to the response to the subscription request. In other embodiments, the establishment of the subscription relationship may also include more message interactions, which is not limited in this embodiment.

S104: when monitoring an update of the target resource, the resource collection device generates a new tag for the target resource according to the generation rule of tags, and updates the current tag of the target resource stored locally to the new tag, where tags generated according to the generation rule have an association relationship.

The current tag of the target resource stored locally by the resource collection device refers to the current tag stored in the resource collection device, in the embodiment of the present application, current tags of the target resource are stored in the resource collection device and the subscription device, respectively.

The generation rule is a rule commonly used by the subscription device and the resource collection device, the subscription device and the resource collection device may reach an agreement on the generation rule used in advance, or the generation rule is preset in the client of the subscription device and the resource collection device, or notified by other devices to the subscription device and the resource collection device.

The tags generated according to the generation rule have an association relationship, for example, the tags of the target resource are increased from small to large, or the tags of the target resource are decreased from large to small, and the step size of each increase or decrease is a fixed value. The tag may also be recycled, for example, the tags are 0-99, the initial value of the current tag of the target resource is 0, subsequently, whenever the target resource is updated, the current tag is increased by 1, after the tag of the target resource is increased from 0 to 99, the tag is assigned again from 0.

Supposing that the current tag of the target resource at a moment T0 is 21, an update of the target resource is monitored at a moment T1 (the moment T1 is later than the moment T0), the resource collection device generates a new tag 22 for the target resource, and updates the current tag of the target resource to 22.

S105: the resource collection device transmits a resource update message to the subscription device, where the resource update message includes a first tag of the target resource and update content of the target resource, and the first tag is the current tag of the target resource stored on the resource subscription device.

The first tag is the latest tag of the target resource, and the resource collection device transmits the updated content to the subscription device through the resource update message. The embodiments of the present application do not limit the resource update message, any messages that may implement similar functions can be called resource update messages, in addition, a name of the resource update message is not limited, which may also be called a notification message, an update message, or other messages.

S106: the subscription device determines whether a version of the target resource is missing according to the first tag, a second tag of the target resource stored locally, and the generation rule of tags included in the resource update message.

Where the tags generated according to the generation rule have an association relationship, the generation rule of tags used by the subscription device and a generation rule of tags used by the resource collection device are the same, and the second tag is the current tag of the target resource stored on the subscription device. In the embodiments of the present application, the subscription device and the resource collection device maintain a current tag for the target device respectively, it is assumed that, in case that the subscription device and the resource collection device complete the resource update and no resource update message is lost, the current version of the target resource stored on the subscription device and the current version of the target resource stored on the resource collection device are the same.

Since the subscription device and the resource collection device use the same generation rule, and the generated tags have an association relationship, the subscription device may determine a tag included in the resource update message in the next resource update according to the current version of the subscription resource stored locally and the generation rule.

The subscription device may determine the tag of the target resource after the resource update of this time according to the second tag of the target resource stored locally and the generation rule of tags, and compare the determined tag of the target resource after the resource update of this time with the first tag included in the resource update message, if they are the same, it is determined that no version of the target resource is missing, and if they are not the same, it is determined that the version of the target resource is missing.

For example, the second tag of the target resource stored on the subscription device is 7, and the generation rule is to add 1 on the basis of a previous tag, the subscription device may determine, according to the second tag and the generation rule, that the tag of the target resource after the resource update of this time is 8, but the first tag in the resource update message is 9, if no version is missing, the tag of the target resource after the local update determined by the subscription device should be the same as the first tag, the fact that the two tags are different indicates that a version is missing, it may be known that the version with the tag 8 is missing according to the generation rule.

In the case that the version of the target resource is missing, S107 is executed, and in the case that no version of the target resource is missing, S108 is executed.

S107: the subscription device acquires a missing version of the target resource from the resource collection device.

S107 is an optional step, if no version of the target resource is missing, S107 is not executed, and S108 is directly executed to modify the second tag.

According to the first tag, the second tag, and the generation rule, the subscription device may not only determine the missing version, but also determine the tag of the missing version, and then request the missing version of the target resource from the resource collection device according to the tag of the missing version of the target resource.

In one manner, the subscription device transmits a first request to the resource collection device, the first request being used to request the missing version of the target resource and including the tag of the missing version of the target resource, and receives a response to the first request from the resource collection device, the response to the first request including the missing version of the target resource.

After receiving the first request, the resource collection device searches whether the missing version exists from the versions of the target resource stored locally according to the tag of the missing version, if the missing version is still stored in the resource collection device, the resource collection device will carry the missing version in the response to the first request and transmit the response to the first request to the subscription device, if the missing version has been deleted from the resource collection device, the resource collection device may return a request failure response to the subscription device, and the request failure response may be carried in the response to the first request.

The resource collection device may maintain a tag list which includes content and tags of one or more versions before the current version of the target resource, the resource collection device queries whether the tag of the missing version exists from the tag list after receiving the first request.

There may be one or more missing versions of the target resource, if there are multiple missing versions of the target resource, the subscription device may request the missing versions from the resource collection device through multiple first requests, and each first request includes only a tag of one missing version. Certainly, the subscription device may also carry tags of the multiple missing versions in the first request, the resource collection device may transmit the multiple missing versions to the subscription device through one response message, or the resource collection device may also transmit the multiple missing versions to the subscription device through multiple response messages, and each response message carries one missing version.

The resource collection device may only store some of the multiple missing versions, in this case, the resource collection device only transmits the stored missing versions to the subscription device.

In another manner, the subscription device transmits a second request to the resource collection device before transmitting the first request to the resource collection device, the second request being used to confirm whether the missing version of the target resource is stored on the resource collection device and including the tag of the missing version of the target resource; receives a response to the second request from the resource collection device, the response to the second request being used to notify whether the missing version of the target resource is stored on the resource collection device; and transmits the first request to the resource collection device when it is determined according to the response to the second request that the missing version of the target resource is stored on the resource collection device.

After receiving the second request, the resource collection device queries whether there is the tag of the missing version from the tag list, determines that the missing version of the target resource is stored on the resource collection device if the tag of the missing version exists in the tag list, and determines that the missing version of the target resource is not stored on the resource collection if the tag of the missing version does not exist in the tag list, there may only be tags of part of the missing versions in the tag list.

The response to the second request may indicate whether the missing version of the target resource is stored on the resource collection device through one or more bits, taking one bit as an example, when a value of this bit is 1, it means that the missing version of the target resource is stored on the resource collection device, when the value of this bit is 0, it means that the missing version of the target resource is not stored on the resource collection device.

When the target resource has multiple subscription relationships, and each subscription relationship in the multiple subscription relationships corresponds to a tag of the target resource, when the multiple tags of the target resource corresponding to the multiple subscription relationships are different, the first request also includes identification information of the subscription relationship, the subscription device acquires the missing version from the resource collection device through the tag of the missing version and the identification information of the subscription relationship.

S108: the subscription device updates the second tag according to the resource update message.

After receiving the resource update message, the subscription device updates the second tag to the first tag included in the resource update message, after the update is completed, the current tag of the target resource stored on the subscription device and the current tag of the target resource stored on the resource collection device are the same.

In this embodiment, a subscription device and a resource collection device respectively maintain a current tag for a subscription resource, where the tag of the subscription resource is generated according to a generation rule, tags generated according to the generation rule have an association relationship; during a resource update process, the subscription device may determine whether a version is missing according to the current tag of the subscription resource transmitted by the resource collection device. Since one or more versions before a current version of the target resource are stored on the resource collection device, the subscription device may request a missing version from the resource collection device when a version is missing, thereby ensuring that the user will not miss the subscription resource.

Figure 3:
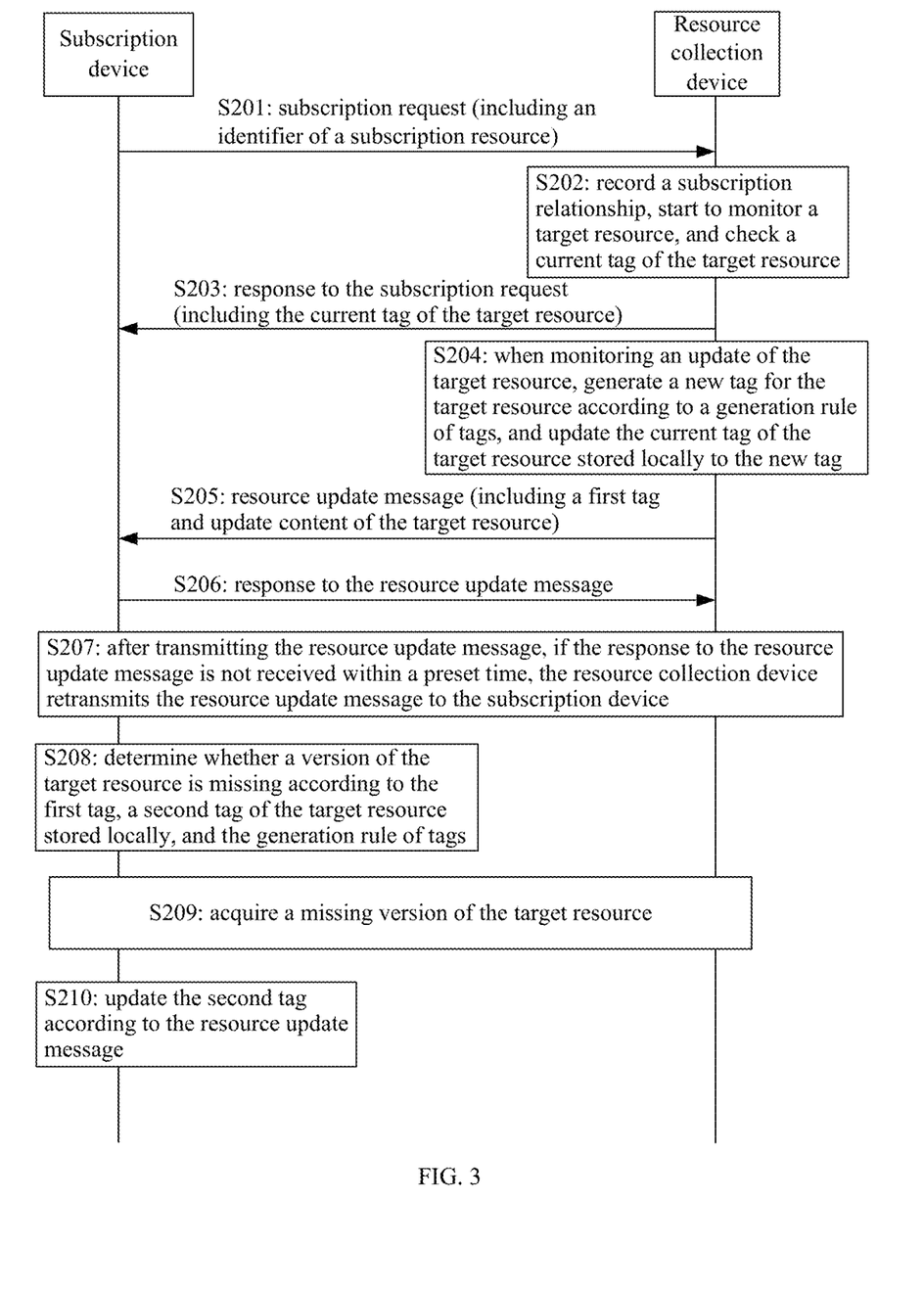
FIG. 3 is a signaling flowchart of a resource subscription method provided by a second embodiment of the present application.

FIG. 3 is a signaling flowchart of a resource subscription method provided by a second embodiment of the present application, as illustrated in FIG. 3, the method of this embodiment is based on the method illustrated in FIG. 2, after receiving the resource update message, the subscription device transmits a response message to the resource collection device, if the resource collection device does not receive the response message of the resource update message, it will retransmit the resource update message. As illustrated in FIG. 3, the method provided in this embodiment includes the following steps:

S201: the subscription device transmits a subscription request to the resource collection device, where the subscription request is used to request a subscription of the target resource;

S202: the resource collection device records a subscription relationship, starts to monitor a target resource, and checks a current tag of the target resource;

S203: the resource collection device transmits a response to the subscription request to the subscription device, where the response to the subscription request includes the current tag of the target resource;

S204: when monitoring an update of the target resource, the resource collection device generates a new tag for the target resource according to the generation rule of tags, and updates the current tag of the target resource stored locally to the new tag.

Among them, the tags generated according to the generation rule have an association relationship, the resource collection device and the subscription device use the same generation rule for the target resource.

S205: the resource collection device transmits a resource update message to the subscription device, where the resource update message includes a first tag of the target resource and update content of the target resource, and the first tag is a current tag of the target resource stored on the resource collection device.

For the specific implementation and the related description of steps S201-S205, reference may be made to S101-105 in the first embodiment, which will not be repeated here.

S206: the subscription device transmits a response to the resource update message to the resource collection device.

The response to the resource update message is used to confirm that the subscription device has received the resource update message, and the response to the resource update message may include the current tag of the target resource and an identifier of the target resource.

In an embodiment, the response to the resource update message may also include identification information of a subscription type and/or a subscription relationship, the identification information of the subscription relationship may be a subscription identifier, or may also be comprised of an identifier of the subscription device, an identifier of the subscription resource, and an identifier of the resource collection device.

S207: after transmitting the resource update message, if the response to the resource update message is not received within a preset time, the resource collection device retransmits the resource update message to the subscription device.

S207 is an optional step, if the resource collection device receives the response to the resource update message within the preset time, this step is not executed, that is, the resource update message will not be retransmitted.

After transmitting the resource update message, the resource collection device may start a timer, if the response to the resource update message is not received before the timer expires, the resource update message is retransmitted, if the response to the resource update message is received before the timer expires, it is determined that the subscription device has received the resource update message.

The resource collection device may not receive the response to the resource update message in the following two cases: the resource update message is lost, and the subscription device does not receive the resource update message, and would not transmit the response to the resource update message naturally; the subscription device receives the resource update message and transmits the response to the resource update message, but the response to the resource update message is lost. In the above two cases, the resource collection device will retransmit the resource update message to the subscription device.

It should be noted that S207 in the figure does not represent a step, but a retransmission process, in which one or more retransmissions may be performed, the resource collection device may set a maximum number of times of retransmission K, for example, the value of K is 3 or 4. In case that a preset maximum number of times of retransmission is reached or in case of determining that the subscription device has received the retransmitted resource update message, stopping retransmitting the resource update message to the subscription device.

After the resource collection device retransmits the resource update message each time, if the subscription device receives the retransmitted resource update message, the subscription device will return the response to the resource update message to the resource collection device, after receiving the response to the resource update message, the resource collection device determines that the retransmission of the resource update message is successful, and stops retransmitting the resource update message.

The resource collection device may successfully retransmit the resource update message through one or more retransmissions, if the resource collection device succeeds in retransmission through one retransmission, no subsequent retransmission is performed, if after one retransmission, no response to the retransmitted resource update message is received within a set time, it is determined that this retransmission has failed, and the next retransmission is performed until the retransmission is successful or the times of retransmission reach the maximum K, then stopping the operation of retransmission.

S208: the subscription device determines whether a version of the target resource is missing according to the first tag, a second tag of the target resource stored locally, and the generation rule of tags included in the resource update message.

The resource update message in this step may be a resource update message retransmitted by the resource collection device, or may be a resource update message initially transmitted by the resource collection device. In case that the version of the target resource is missing, S209 is executed, and in case that no version of the target resource is missing, S210 is executed.

S209: the subscription device acquires a missing version of the target resource from the resource collection device.

S210: the subscription device updates the second tag according to the resource update message.

For the specific implementation of S208-S210, reference may be made to the description of the steps S106-108 in the first embodiment, which will not be repeated here.

In this embodiment, after receiving a resource update message, the subscription device returns a response to the resource update message to the resource collection device, the resource collection device may timely determine whether the resource update message is missing according to the response to the resource update message. In case that the resource update message is missing, it is ensured that the user may timely acquire the missing version by retransmitting the resource update message. Even in case that the retransmission is not successful, the subscription device may discover the missing version according to the tag of the subscription resource when the subscription resource is updated next time, and then acquire the missing version from the resource collection device, thereby ensuring that the user will not lose the subscription resource.

Figure 4:
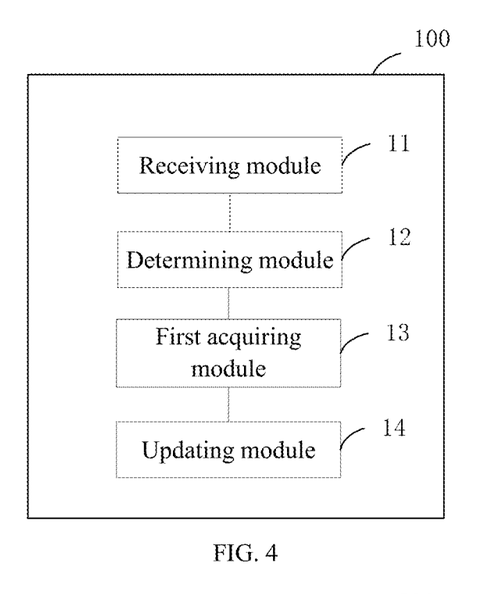
FIG. 4 is a structural schematic diagram of a subscription device provided by a third embodiment of the present application.

FIG. 4 is a structural schematic diagram of a subscription device provided by a third embodiment of the present application, as illustrated in FIG. 4, the subscription device 100 provided in the embodiment includes:
- a receiving module 11, configured to receive a resource update message transmitted by a resource collection device, where the resource update message includes updated content of the target resource subscribed and a first tag of the target resource, and the first tag is a current tag of the target resource stored on the resource collection device;
- a determining module 12, configured to determine whether a version of the target resource is missing according to the first tag, a second tag of the target resource stored locally, and a generation rule of tags, where tags generated according to the generation rule have an association relationship, the generation rule of tags used by the subscription device and a generation rule of tags used by the resource collection device are the same, and the second tag is a current tag of the target resource stored on the subscription device;
- a first acquiring module 13, configured to acquire a missing version of the target resource from the resource collection device in case that the version of the target resource is missing; and
- an updating module 14, configured to update the second tag according to the resource update message.

In an embodiment, the subscription device 100 further includes: a second acquiring module, configured to acquire the current tag of the target resource from the resource collection device in a process of establishing a subscription relationship with the resource collection device before the receiving module receives the resource update message transmitted by the resource collection device.

In an embodiment, the second acquiring module is specifically configured to transmit a subscription request to the resource collection device, where the subscription request is used to request a subscription of the target resource, and receive a response to the subscription request transmitted by the resource collection device, where the response to the subscription request includes the current tag of the target resource.

In an embodiment, the subscription request includes first indication information, and the first indication information is used to indicate whether to set a tag for the target resource.

In an embodiment, the first acquiring module 13 is specifically configured to determine a tag of the missing version of the target resource according to the first tag, the second tag, and the generation rule, and request the missing version of the target resource from the resource collection device according to the tag of the missing version of the target resource.

In an embodiment, the acquiring module 13 requests the missing version of the target resource from the resource collection device according to the tag of the missing version of the target resource includes:
- transmitting a first request to the resource collection device, where the first request is used to request the missing version of the target resource, and the first request includes the tag of the missing version of the target resource; and
- receiving a response to the first request from the resource collection device, where the response to the first request includes the missing version of the target resource.

In an embodiment, before transmitting the first request to the resource collection device, the first acquiring module 13 is further configured to:
- transmit a second request to the resource collection device, where the second request is used to confirm whether the missing version of the target resource is stored on the resource collection device, and the second request includes the tag of the missing version of the target resource;
- receive a response to the second request from the resource collection device, where the response to the second request is used to notify whether the missing version of the target resource is stored on the resource collection device; and
- transmit the first request to the resource collection device in case that the missing version of the target resource is determined to be stored on the resource collection device according to the response to the second request.

In an embodiment, the subscription device 100 further includes:
- a transmitting module, configured to transmit the response to the resource update message to the resource collection device, where the response to the resource update message is used to notify that the subscription device has received the resource update message.

In an embodiment, the target resource has multiple subscription relationships, and the multiple subscription relationships correspond to a tag of the target resource.

In an embodiment, the target resource has multiple subscription relationships, and each subscription relationship corresponds to a tag of the target resource, multiple tags of the target resource corresponding to the multiple subscription relationships are different.

When the target resource has multiple subscription relationships, the first request further includes identification information of the subscription relationship.

When the target resource has multiple subscription relationships, both the first request and the second request includes identification information of the subscription relationship.

The subscription device provided in any implementation of the embodiments is used to execute the technical solution executed by the subscription device in any of the foregoing method embodiments, and its implementation principles and technical effects are similar, which will not be repeated here.

Figure 5:
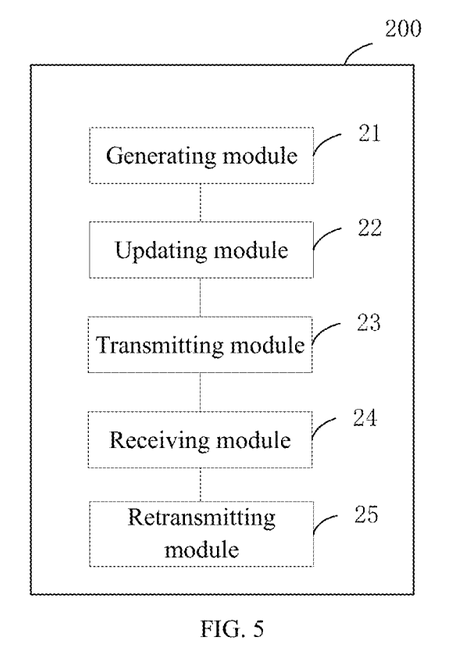
FIG. 5 is a structural schematic diagram of a resource collection device provided by a fourth embodiment of the present application.

FIG. 5 is a structural schematic diagram of a resource collection device provided by a fourth embodiment of the present application, as illustrated in FIG. 5, the resource collection device 200 provided in the embodiment includes:

a generating module 21, configured to, in case that an update of a target resource is monitored, generate a new tag for the target resource according to a generation rule of tags and a current tag of the target resource stored locally, where tags generated according to the generation rule have an association relationship;

an updating module 22, configured to update the current tag of the target resource to the new tag; and a transmitting module 23, configured to transmit a resource update message to the subscription device, where the resource update message includes a first tag of the target resource and update content of the target resource, and the first tag is a current tag of the target resource stored on the resource collection device.

In an embodiment, the transmitting module 23 is further configured to transmit the current tag of the target resource to the subscription device in a process of establishing a subscription relationship with the subscription device.

In an embodiment, the resource collection device 200 further includes: a receiving module 24, configured to receive a subscription request transmitted by the subscription device, where the subscription request is used to request a subscription of the target resource; and the transmitting module 23 is specifically configured to transmit a response to the subscription request to the resource collection device, where the response to the subscription request includes the current tag the target resource.

In an embodiment, the subscription request includes first indication information, and the first indication information is used to indicate whether to set a tag for the target resource.

In an embodiment, the resource collection device 200 further includes a retransmitting module 25, configured to retransmit the resource update message to the subscription device after the transmitting module transmits the resource update message, if the resource collection device does not receive a response to the resource update message transmitted by the subscription device within a preset time; and stop retransmitting the resource update message to the subscription device in case that a preset maximum number of times of retransmission is reached or in case that it is determined that the subscription device has received the retransmitted resource update message.

In an embodiment, the resource collection device 200 further includes a searching module, correspondingly, the receiving module 24 is further configured to receive a first request transmitted by the subscription device, where the first request is used to request a missing version of the target resource, and the first request includes a tag of the missing version of the target resource; the searching module is configured to search the missing version from a tag list according to the tag of the missing version, where a current version of the target resource and one or more versions earlier than the current version are saved in the tag list; and the transmitting module is configured to transmit a response to the first request to the subscription device in case that the searching module finds the missing version, where the response to the first request includes the missing version of the target resource.

In an embodiment, the receiving module 24 is further configured to receive a second request transmitted by the subscription device before receiving the first request transmitted by the subscription device, where the second request is used to confirm whether the missing version of the target resource is stored on the resource collection device, and the second request includes the tag of the missing version of the target resource; the searching module is further configured to determine whether there is the missing version of the target resource stored according to the tag of the missing version of the target resource and the tag list; and the transmitting module 23 is further configured to transmit a response to the second request to the subscription device, where the response to the second request is used to notify whether the missing version of the target resource is stored on the resource collection device.

In an embodiment, the multiple versions in the tag list that are earlier than the current version are multiple versions of which tags are consecutive.

In an embodiment, the target resource has multiple subscription relationships, and the multiple subscription relationships correspond to a tag of the target resource.

In an embodiment, the target resource has multiple subscription relationships, and each subscription relationship corresponds to a tag of the target resource, multiple tags of the target resource corresponding to the multiple subscription relationships are different.

In an embodiment, the target resource has multiple subscription relationships, and each subscription relationship corresponds to a tag of the target resource, multiple tags of the target resource corresponding to the multiple subscription relationships are different; the first request further includes identification information of a subscription relationship corresponding to the missing version of the target resource.

In an embodiment, the target resource has multiple subscription relationships, and each subscription relationship corresponds to a tag of the target resource, multiple tags of the target resource corresponding to the multiple subscription relationships are different; both the first request and the second request include identification information of a subscription relationship corresponding to the missing version of the target resource.

The resource collection device provided in any implementation of the embodiments is used to execute the technical solution executed by the resource collection device in any of the foregoing method embodiments, and its implementation principles and technical effects are similar, which will not be repeated here.

Figure 6:
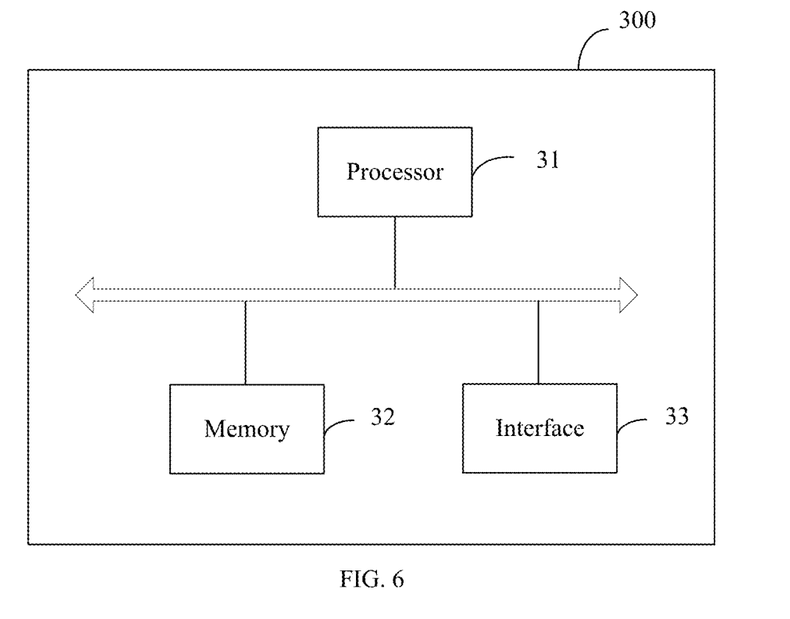
FIG. 6 is a structural schematic diagram of a subscription device provided by a fifth embodiment of the present application.

FIG. 6 is a structural schematic diagram of a subscription device provided by a fifth embodiment of the present application, as illustrated in FIG. 6, the subscription device 300 includes:

a processor 31, a memory 32, and an interface 33 communicating with other devices;

the memory 32 stores computer executable instructions;

the processor 31 is configured to call and run the computer program stored in the memory to:

control the interface 33 to receive a resource update message transmitted by a resource collection device, where the resource update message includes updated content of a target resource subscribed and a first tag of the target resource, and the first tag is a current tag of the target resource stored on the resource collection device;

determine whether a version of the target resource is missing according to the first tag, a second tag of the target resource stored locally, and a generation rule of tags, where tags generated according to the generation rule have an association relationship, the generation rule of tags used by the subscription device and a generation rule of tags used by the resource collection device are the same, and the second tag is a current tag of the target resource stored on the subscription device;

control the interface 33 to acquire a missing version of the target resource from the resource collection device in case that the version of the target resource is missing; and update the second tag according to the resource update message.

FIG. 6 is a simple design of the subscription device, the embodiment of the present application does not limit the number of processors and memories in the subscription device, FIG. 6 simply takes 1 as an example for illustration.

In an embodiment, the processor 31 is further configured to:

control the interface 33 to acquire the current tag of the target resource from the resource collection device in a process of establishing a subscription relationship with the resource collection device before the receiving module receives the resource update message transmitted by the resource collection device.

In an embodiment, the processor 31 is configured to:

control the interface 33 to transmit a subscription request to the resource collection device, wherein the subscription request is used to request a subscription of the target resource; and control the interface 33 to receive a response to the subscription request transmitted by the resource collection device, wherein the response to the subscription request comprises the current tag of the target resource.

In an embodiment, the subscription request includes first indication information, and the first indication information is used to indicate whether to set a tag for the target resource.

In an embodiment, the processor 31 is configured to:

determine a tag of the missing version of the target resource according to the first tag, the second tag, and the generation rule; and request the missing version of the target resource from the resource collection device according to the tag of the missing version of the target resource.

It should be noted that the processor 31 can execute the computer executable instructions stored in the memory, to cause the processor 31 to execute the technical solution executed by the resource collection device in any of the foregoing method embodiments.

Figure 7:
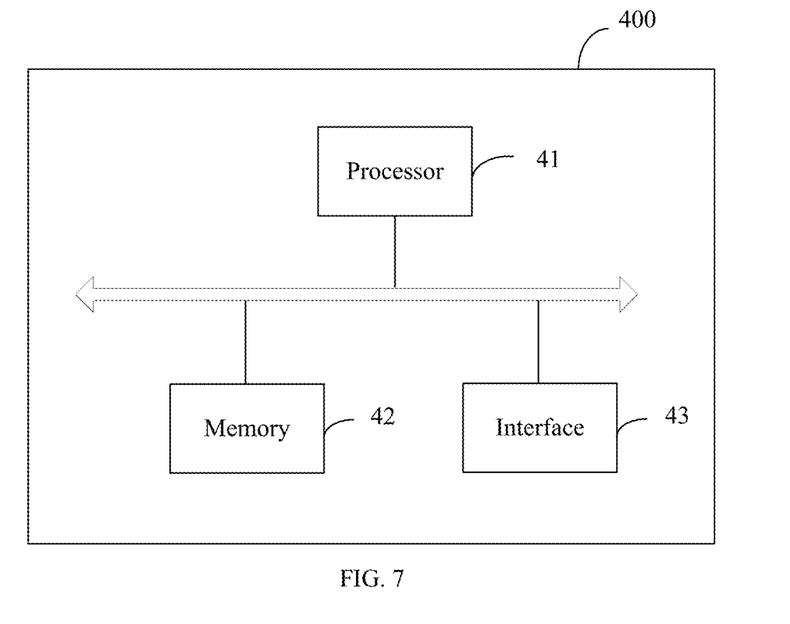
FIG. 7 is a structural schematic diagram of a resource collection device provided by a sixth embodiment of the present application.

FIG. 7 is a structural schematic diagram of a resource collection device provided by a sixth embodiment of the present application, as illustrated in FIG. 7, the resource collection device 400 includes:

a processor 41, a memory 42, and an interface 43 communicating with other devices;

the memory 42 stores computer executable instructions;

the processor 41 executes the computer executable instructions stored in the memory, to cause the processor 41 to execute the technical solution executed by the resource collection device in any of the foregoing method embodiments.

FIG. 7 is a simple design of the resource collection device, the embodiment of the present application does not limit the number of processors and memories in the resource collection device, FIG. 7 simply takes 1 as an example for illustration.

In a specific implementation of the subscription device or resource collection device shown in the foregoing embodiment, the memory, the processor, and the interface may be connected by a bus, in an embodiment, the memory may be integrated inside the processor.

An embodiment of the present application may also provide a computer readable storage medium with computer executable instructions stored thereon, the technical solution executed by the subscription device in any of the foregoing method embodiments is implemented when the computer executable instructions is executed by a processor.

An embodiment of the present application may also provide a computer readable storage medium with computer executable instructions stored thereon, the technical solution executed by the resource collection device in any of the foregoing method embodiments is implemented when the computer executable instructions is executed by a processor.

An embodiment of the present application provides a program which is used to implement the technical solution executed by the subscription device in any of the foregoing method embodiments when the program is executed by a processor.

An embodiment of the present application provides a program which is used to implement the technical solution executed by the resource collection device in any of the foregoing method embodiments when the program is executed by a processor.

In an embodiment, the foregoing processor may be a chip.

An embodiment of the present application provides a computer program product including a program instruction, which is used to implement the technical solution executed by the subscription device in any of the foregoing method embodiments.

An embodiment of the present application provides a computer program product, including a program instruction, which is used to implement the technical solution executed by the resource collection device in any of the foregoing method embodiments.

An embodiment of the present application provides a chip including a processing module and a communication interface, the processing module may execute the technical solution executed by the subscription device in any of the foregoing method embodiments.

Further, the chip also includes a storage module (such as a memory), the storage module is configured to store instructions, the processing module is configured to execute the instructions stored in the storage module, and the execution of the instructions stored in the storage module causes the processing module to execute the technical solution executed by the subscription device in any of the foregoing method embodiments.

An embodiment of the present application provides a chip including a processing module and a communication interface, the processing module may execute the technical solution executed by the resource collection device in any of the foregoing method embodiments.

Further, the chip also includes a storage module (such as a memory), the storage module is configured to store instructions, the processing module is configured to execute the instructions stored in the storage module, and the execution of the instructions stored in the storage module causes the processing module to execute the technical solution executed by the resource collection device in any of the foregoing method embodiments.

In the several embodiments provided in the present application, it should be understood that the disclosed device and method may be implemented in other ways. For example, the device embodiments described above are only schematic, for example, the division of the modules is only a logical function division, and there may be other divisions in actual implementation, for example, multiple modules may be combined or integrated into another system, or some features may be ignored, or not implemented. In addition, the displayed or discussed mutual coupling or direct coupling or communication connection may be through some interfaces, the indirect coupling or communication connection of the modules may be in electrical, mechanical or other forms.

In the specific implementation of the foregoing resource collection device and subscription device, it should be understood that the processor may be a central processing unit (CPU), or other general processors or digital signal processors (DSP), application specific integrated circuits (ASIC), etc. The general processor may be a microprocessor or the processor may also be any conventional processor or the like. The steps with reference to the methods disclosed in the present application may be directly embodied as being executed and completed by a hardware processor, or executed and completed by a combination of a hardware and a software module in the processor.

All or part of the steps in the foregoing method embodiments may be completed by a hardware related to a program instruction. The foregoing program may be stored in a readable memory. The program, when executed, executes the steps including the foregoing method embodiments; and the foregoing memory (storage medium) includes: a read-only memory (ROM), an RAM, a flash memory, a hard disk, a solid state drive, a magnetic tape, a floppy disk, an optical disc and any combination thereof.

What is claimed is:

1. A resource subscription method applied to a subscription device, comprising:
    receiving a resource update message transmitted by a resource collection device, wherein the resource update message comprises updated content of a target resource subscribed and a first tag of the target resource, and the first tag is a current tag of the target resource stored on the resource collection device;
    determining whether a version of the target resource is missing according to the first tag, a second tag of the target resource stored locally, and a generation rule of tags, wherein tags generated according to the generation rule have an association relationship, the generation rule of tags used by the subscription device and a generation rule of tags used by the resource collection device are the same, and the second tag is a current tag of the target resource stored on the subscription device;
    in case that no version of the target resource is missing, updating the second tag according to the resource update message; and
    in case that the version of the target resource is missing, performing following operations:
        transmitting a second request to the resource collection device, wherein the second request is used to confirm whether a missing version of the target resource is stored on the resource collection device, and the second request comprises a tag of the missing version of the target resource;
        receiving a response to the second request from the resource collection device, wherein the response to the second request is used to notify whether the missing version of the target resource is stored on the resource collection device; and
        acquiring the missing version of the target resource from the resource collection device and updating the second tag according to the resource update message, in case that the missing version of the target resource is determined to be stored on the resource collection device according to the response to the second request.

2. The method according to claim 1, wherein before receiving the resource update message transmitted by the resource collection device, the method further comprises:
    acquiring the current tag of the target resource from the resource collection device in a process of establishing a subscription relationship with the resource collection device.

3. The method according to claim 2, wherein the acquiring the current tag of the target resource from the resource collection device in the process of establishing the subscription relationship with the resource collection device comprises:
    transmitting a subscription request to the resource collection device, wherein the subscription request is used to request a subscription of the target resource; and
    receiving a response to the subscription request transmitted by the resource collection device, wherein the response to the subscription request comprises the current tag of the target resource.

4. The method according to claim 2, wherein the subscription request comprises first indication information, and the first indication information is used to indicate whether to set a tag for the target resource.

5. The method according to claim 1, wherein the acquiring the missing version of the target resource from the resource collection device comprises:
    determining the tag of the missing version of the target resource according to the first tag, the second tag, and the generation rule; and
    requesting the missing version of the target resource from the resource collection device according to the tag of the missing version of the target resource.

6. The method according to claim 5, wherein the requesting the missing version of the target resource from the resource collection device according to the tag of the missing version of the target resource comprises:
    transmitting a first request to the resource collection device, wherein the first request is used to request the missing version of the target resource, and the first request comprises the tag of the missing version of the target resource; and
    receiving a response to the first request from the resource collection device, wherein the response to the first request comprises the missing version of the target resource.

7. A subscription device, comprising:
    a processor and a memory, wherein the memory is configured to store a computer program, and the processor is configured to call and run the computer program stored in the memory to:
    control an input interface to receive a resource update message transmitted by a resource collection device, wherein the resource update message comprises updated content of a target resource subscribed and a first tag of the target resource, and the first tag is a current tag of the target resource stored on the resource collection device;

determine whether a version of the target resource is missing according to the first tag, a second tag of the target resource stored locally, and a generation rule of tags, wherein tags generated according to the generation rule have an association relationship, the generation rule of tags used by the subscription device and a generation rule of tags used by the resource collection device are the same, and the second tag is a current tag of the target resource stored on the subscription device;

in case that no version of the target resource is missing, update the second tag according to the resource update message;

in case that the version of the target resource is missing, control an output interface to transmit a second request to the resource collection device, wherein the second request is used to confirm whether a missing version of the target resource is stored on the resource collection device, and the second request comprises the tag of the missing version of the target resource; and control the input interface to: receive a response to the second request from the resource collection device, wherein the response to the second request is used to notify whether the missing version of the target resource is stored on the resource collection device; and acquire a missing version of the target resource from the resource collection device and update the second tag according to the resource update message, in case that the missing version of the target resource is determined to be stored on the resource collection device according to the response to the second request.

8. The device according to claim 7, wherein the processor is further configured to:
control the input interface to acquire the current tag of the target resource from the resource collection device in a process of establishing a subscription relationship with the resource collection device before the receiving module receives the resource update message transmitted by the resource collection device.

9. The device according to claim 8, wherein the processor is configured to:
control the output interface to transmit a subscription request to the resource collection device, wherein the subscription request is used to request a subscription of the target resource; and
control the input interface to receive a response to the subscription request transmitted by the resource collection device, wherein the response to the subscription request comprises the current tag of the target resource.

10. The device according to claim 8, wherein the subscription request comprises first indication information, and the first indication information is used to indicate whether to set a tag for the target resource.

11. The device according to claim 7, wherein the processor is configured to:
determine the tag of the missing version of the target resource according to the first tag, the second tag, and the generation rule; and
request the missing version of the target resource from the resource collection device according to the tag of the missing version of the target resource.

* * * * *